Sept. 18, 1962  D. ROSAHL ET AL  3,054,192
PRODUCTION OF STABLE POLYCHLOROPRENE
Filed Dec. 9, 1958
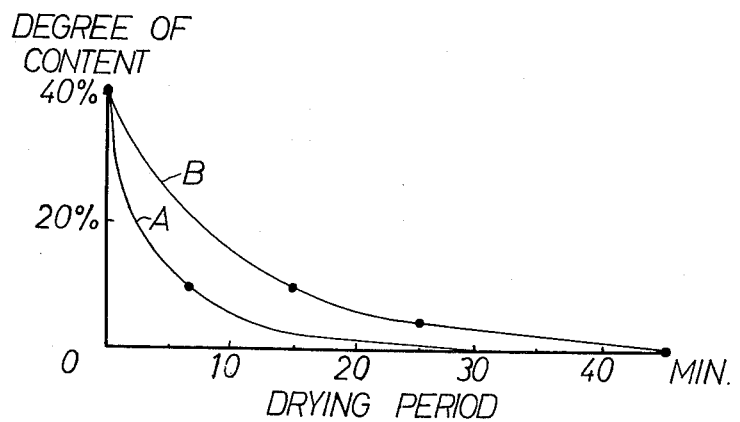
INVENTORS:
DIETRICH ROSAHL, WILHELM GRAULICH, HERMANN HOLZRICHTER,
JULIUS PETER.
BY
their ATTORNEYS 3,054,192
PRODUCTION OF STABLE POLYCHLOROPRENE
Dietrich Rosahl, Koln-Stammheim, Wilhelm Graulich and Hermann Holzrichter, Leverkusen, and Julius Peter, Odenthal, Bergisch Gladbach, Germany, assignors to Farbenfabriken Bayer Aktiengesellschaft, Leverkusen, Germany, a corporation of Germany
Filed Dec. 9, 1958, Ser. No. 779,183
2 Claims. (Cl. 34—4)

The present invention relates to a novel and efficient process of producing polychloroprene of high stability under storage conditions.

It is known that aqueous emulsions of polychloroprene cannot be precipitated and isolated like the ordinary synthetic rubber types. It is further known that the production of polychloroprene polymers of high stability under storage conditions involves difficulties. In "Chem. Eng. Progr. 43 (1947) pages 391–398" there is described a process of isolating polychloroprene from their latices. In this process a sheet of wet rubber is passed through a drier and dried at temperatures of about 120° C., the plasticity of the final product being adjusted to the desired value by varying the drying temperature, i.e. by thermal decomposition.

However, the storage stability of the polymers which were isolated and dried by the aforesaid methods, is unsatisfactory, since the Defo values of said polymers show a considerable increase on storage. The unsatisfactory result is to be seen from an essential change of the Defo number already after storage for 6 months. For instance a freshly isolated polychloroprene of the Defo number 280/22 shows the Defo number 1600/55 after storage for 6 months. This increase of the Defo number on storage is probably caused by slowly proceeding cross-linkage of the product.

In accordance with the invention it has been found that polychloroprene of good stability in storage is obtained by drying a polymer which has been adjusted to the desired final plasticity (i.e. a Defo hardness value between about 180 and 3000) during polymerization, below 100° C., preferably within the range of 60–95° C. It is of advantage to dry the polymer in form of a sheet of a thickness of about 150 to 500 g./m.² at a density of 1.23, preferably 300 to 400 g./m.², calculated on the dry weight, a period of about 20–60 minutes being required for the drying process.

The drying process can be shortened without impairing the stability in storage—this is a surprising feature of the invention—by pre-drying the wet polymer sheet with infrared rays. The polymer sheet can also be completely dried by means of infrared rays provided that the sheet is of uniform thickness. In the latter case, the drying process requires only about 5–20 minutes.

It has proved to be of particular advantage to accomplish the drying process with infrared radiators having an emission maximum between about 1.5–3/µ, the emission at wave lengths of more than 6/µ amounting to not more than 5 percent of the emission within the emission maximum.

In this range the absorption of infrared rays by the polymer is negligible so that it is not changed in its chemical structure by the drying process.

The aforedescribed favorable result could not be foreseen since, as is known, infrared drying due to the high energy transfer radiation is mostly accompanied by chemical reactions.

It is within the scope of the invention to accomplish the drying process by means of infrared rays in combination with hot air of a temperature of about 60–95° C.

The drying process can be carried out in the most varied types of drying apparatus. However, it has to be taken into consideration that the polymer is considerably tacky in heat and does not show internal strength. Therefore it is advantageous to pass the rubber sheet through the drier on a continuously moving sieve. In practicing the invention, a polychloroprene coagulate which has been isolated by freezing (compare German Patent Specification 537,032), is washed in form of a sheet and passed through a squeezing apparatus in order to remove the water adhering to the surface of the sheet. A sieve netting of stainless steel which is passed through the drier in horizontal levels, has proved to be especially suitable as a support for conveying the polychloroprene sheet. By passing the polymer having a moisture content of about 40 to 80 percent by weight at a velocity of 2 to 10 m./minute over a length of about 16 to 40 m. under infrared light radiators of an emission capacity of 3 to 6 kilowatt/m.² at a distance of 10 to 40 cm., the product is substantially dried. The product can be dried completely by passing same along another infrared-heated path provided that the sheet to be dried is of uniform thickness. Since however the preparation of sheets of perfect uniformity often involves difficulties it is advisable to accomplish the final drying of non-homogeneous surfaces by means of hot air, which may be wet hot air, of about 60 to 95° C. However, any non-homogeneity in the sheet can be evened up to a certain extent by adjusting the intensity of the infrared emission to the thickness of the sheet in any given case. When the drying of the rubber sheet is accomplished by infrared rays in combination with hot air the total drying period is substantially reduced.

Since the rubber is generally required by the rubber industry to be of high plasticity, the external tackiness of the polymer at the drying temperature is so high that the rubber sheet adheres to the conveying support even if it is passed through the drier on the underside of the sieve netting. Releasing of the chloroprene rubber from the support can be facilitated by passing the rubber sheet after drying through a cooling zone (at a temperature of about 10 to 25° C.).

The invention is further illustrated by the following examples without being restricted thereto, the parts being by weight.

EXAMPLE 1

Process of producing chloroprene polymer which is stable in storage and the final plasticity of which is adjusted during polymerization:

4 parts of a disproportionated rosin soap, 0.9 part of a condensation product from the sodium salt of naphthalene sulfonic acid and formaldehyde, 0.9 part of sodium hydroxide and 0.45 part of potassium persulfate are dissolved in 150 parts of water and the solution is mixed while stirring at 50° C. with a solution of 0.4 part of n-dodecylmercaptan, 0.06 part of phenothiazine in 100 parts of chloroprene.

Polymerization starts soon. After 80 percent of the chloroprene have been polymerized the reaction is stopped by adding an emulsion of 0.1 part of phenothiazine dissolved in 1.5 parts of benzene, emulsified with 3.0 parts of a 2 percent aqueous solution of the sodium salt of an aliphatic long-chain sulphonic acid, the residue of the monomer is removed by blowing with steam in vacuum and the latex is made into sheets of about 0.5 to 3 mm. thickness by freezing.

By drying the thin sheet in vacuum at room temperature under extraordinarily careful conditions a product of a Defo number of 350/21 is obtained. Upon drying these thin layers by the above described drying process (e.g. by means of infrared rays in combination with hot air, see Example 3) the sheet has the same Defo number, viz. 325/22, within the limits of error. This shows that the polymer prepared as described above has been adjusted to the final Defo number during the polymerization process and is not affected by the herein described drying process.

EXAMPLE 2

The following Table 1 shows the influence of elevated temperatures of hot air used for drying on the storage stability of a polymer produced as described in Example 1. The table shows the Defo numbers of the product after being stored for 3 and 6 days respectively at 70° C. Storage at 70° C. means testing the product for its storage stability within a reduced period of time. The Defo number obtained after storage for 6 days corresponds to a storage time of 6 months at ordinary temperature.

*Table 1*

| Drying at— | Defo number immediately after processing | Defo number after 3 and 6 days' storage at 70° C. | |
|---|---|---|---|
| 80° C | 525/31 | 550/31 | 600/34 |
| 120° C | 280/24 | 500/38 | 1,600/55 |

These figures clearly show that the product dried at 80° C. is scarcely changed, while the storage stability is substantially impaired by drying the polymer at 120° C.

EXAMPLE 3

For comparison, the accompanying FIGURE shows the drying periods of a polychloroprene sheet having a thickness of 300 g./m.$^2$ at a density of 1.23 when the drying process is carried out with infrared rays (emission capacity, 4.5 kilowatt/m.$^2$, distance of the radiator from the sheet, 25 cm., length of the radiated path, 16 m., velocity of the moving sheet, 2.5 m./minute) in combination with hot air (temperature, 80° C., velocity of the air current, 0.5 m./sec.) (curve A) and when drying is accomplished only with hot air (temperature 80° C., velocity of the air current 0.5 m./sec.) (curve B), the moisture content being by reference to the dry substance.

The course of the curve shows that the drying period is substantially reduced by drying with infrared rays.

It may be seen from the following Table 2 that the Defo numbers of the product are not substantially influenced by drying at elevated temperatures within short periods of time.

*Table 2*

| Method of drying | Defo number immediately after processing | Defo number after 3 days' storage at 70° C. | Defo number after 6 days' storage at 70° C. |
|---|---|---|---|
| Drying with hot-air | 400/21 | 400/20 | 400/20 |
| Combined drying | 325/22 | 310/21 | 340/20 |

We claim:
1. A process of drying wet polychloroprene which comprises passing a wet coagulated polychloroprene sheet having a water content of about 40 to 80 percent by weight and having a thickness corresponding to about 150 to 500 g./m.$^2$ at a density of 1.23 as calculated on dry weight, at a velocity of at least 2 metres/minute at a distance of about 10 to 40 centimeters under infrared light radiators covering a length of about 16 to 40 metres and having an emission capacity of 3 to 6 kilowatts per square meter of polychloroprene sheet and an emission maximum in the range of 1 to 3/$\mu$.

2. A process according to claim 1, wherein air at a temperature of about 60 to 95° C. is passed over said polychloroprene sheet, and thereby removing the water which evaporates from said heated polychloroprene.

References Cited in the file of this patent

UNITED STATES PATENTS

| 1,209,643 | Price | Dec. 19, 1916 |
| 1,998,615 | Groven | Apr. 23, 1932 |
| 2,186,067 | Groven | Jan. 9, 1940 |
| 2,405,813 | Blanchard | Aug. 13, 1946 |
| 2,419,875 | Birdseye | Apr. 29, 1947 |
| 2,668,364 | Colton | Feb. 9, 1954 |
| 2,746,169 | Bakker | May 22, 1956 |
| 2,751,365 | Scott | June 19, 1956 |